United States Patent [19]

Fosberg

[11] Patent Number: 5,044,033
[45] Date of Patent: Sep. 3, 1991

[54] FORCIBLE ENTRY TOOL

[76] Inventor: Timothy A. Fosberg, 7719 Timber Hill, Huber Heights, Ohio 45424

[21] Appl. No.: 539,099

[22] Filed: Jun. 15, 1990

[51] Int. Cl.$^5$ .......................... B66F 15/00; B25F 1/00; B25F 3/00; B26B 11/00
[52] U.S. Cl. .......................................... 7/166; 7/100; 7/158; 30/123
[58] Field of Search .......................... 30/123, 277, 177; 7/100, 114, 116, 117, 138, 158, 166, 107

[56] References Cited

U.S. PATENT DOCUMENTS

| | | | |
|---|---|---|---|
| 1,472,517 | 10/1923 | Fry | 7/166 |
| 1,551,035 | 8/1925 | Kurau | 7/166 |
| 1,851,697 | 3/1932 | Elliott | 7/166 |
| 2,482,805 | 9/1949 | Stafford | 7/166 |
| 3,219,316 | 11/1965 | Fried | 254/131 |
| 3,599,255 | 8/1971 | Carroll, Sr. | 7/8.1 |
| 3,694,918 | 10/1972 | Bailey et al. | 30/277 |
| 4,287,623 | 9/1981 | Tarran | 7/158 |
| 4,685,213 | 8/1987 | Powers | 30/123 |
| 4,727,609 | 3/1988 | Smith, Jr. | 7/158 |
| 4,817,221 | 4/1989 | Ryan | 7/158 |

FOREIGN PATENT DOCUMENTS

| | | | |
|---|---|---|---|
| 0076787 | 4/1983 | European Pat. Off. | 7/158 |
| 5322 | of 1914 | United Kingdom | 7/158 |

*Primary Examiner*—Douglas D. Watts
*Assistant Examiner*—Paul M. Heyrana, Sr.
*Attorney, Agent, or Firm*—Biebel & French

[57] ABSTRACT

A forcible entry tool includes an elongate pry bar having at one end a cutting section comprising a gripping block and a cutting blade. The gripping block has a forward gripping pad which acts as a fulcrum point, about which the tool can pivot. The blade can be thrust towards the material to be cut to pierce through the material, or alternatively, the tool can be swung like an axe to cut through the material. In either event, after an opening is formed in the material, the cutting blade can be inserted into the opening with the gripping block above the material. Continued pumping of the pry bar about the pivot point transfers a cutting force to the cutting blade to shear the material. Alternate tool portions such as prying heads and saw blades can be installed at the opposite end of the bar for various other uses.

19 Claims, 7 Drawing Sheets

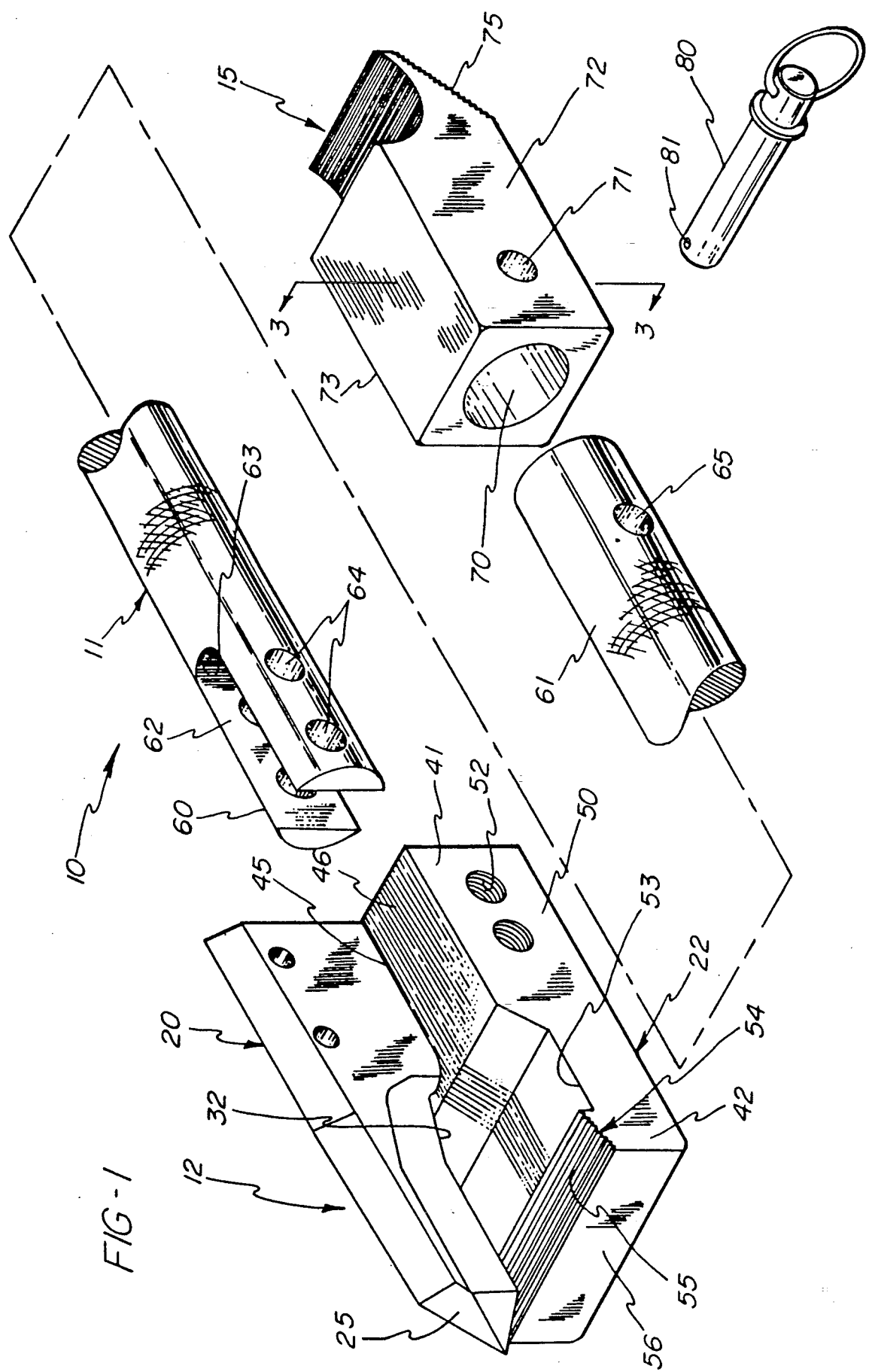

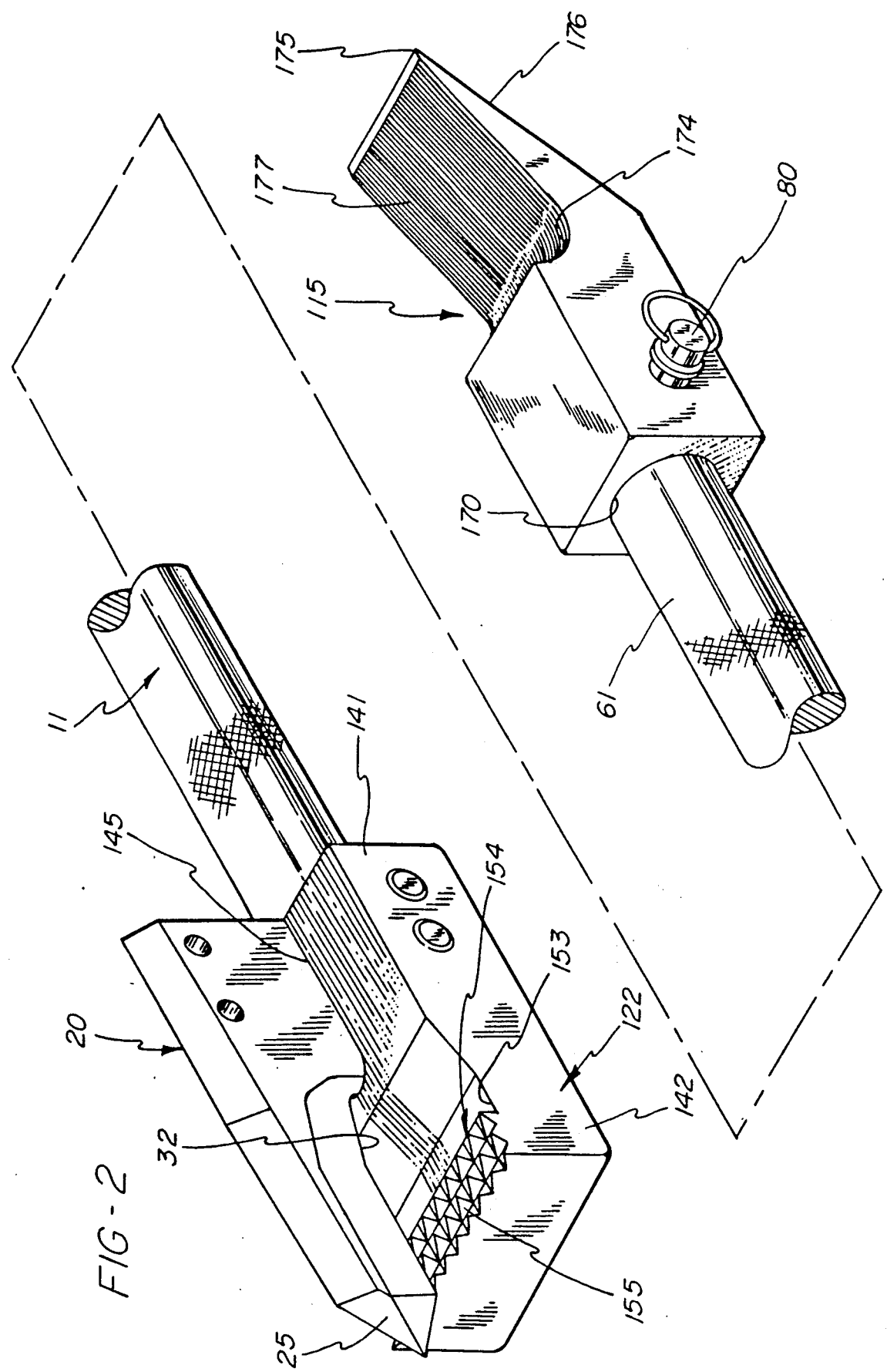

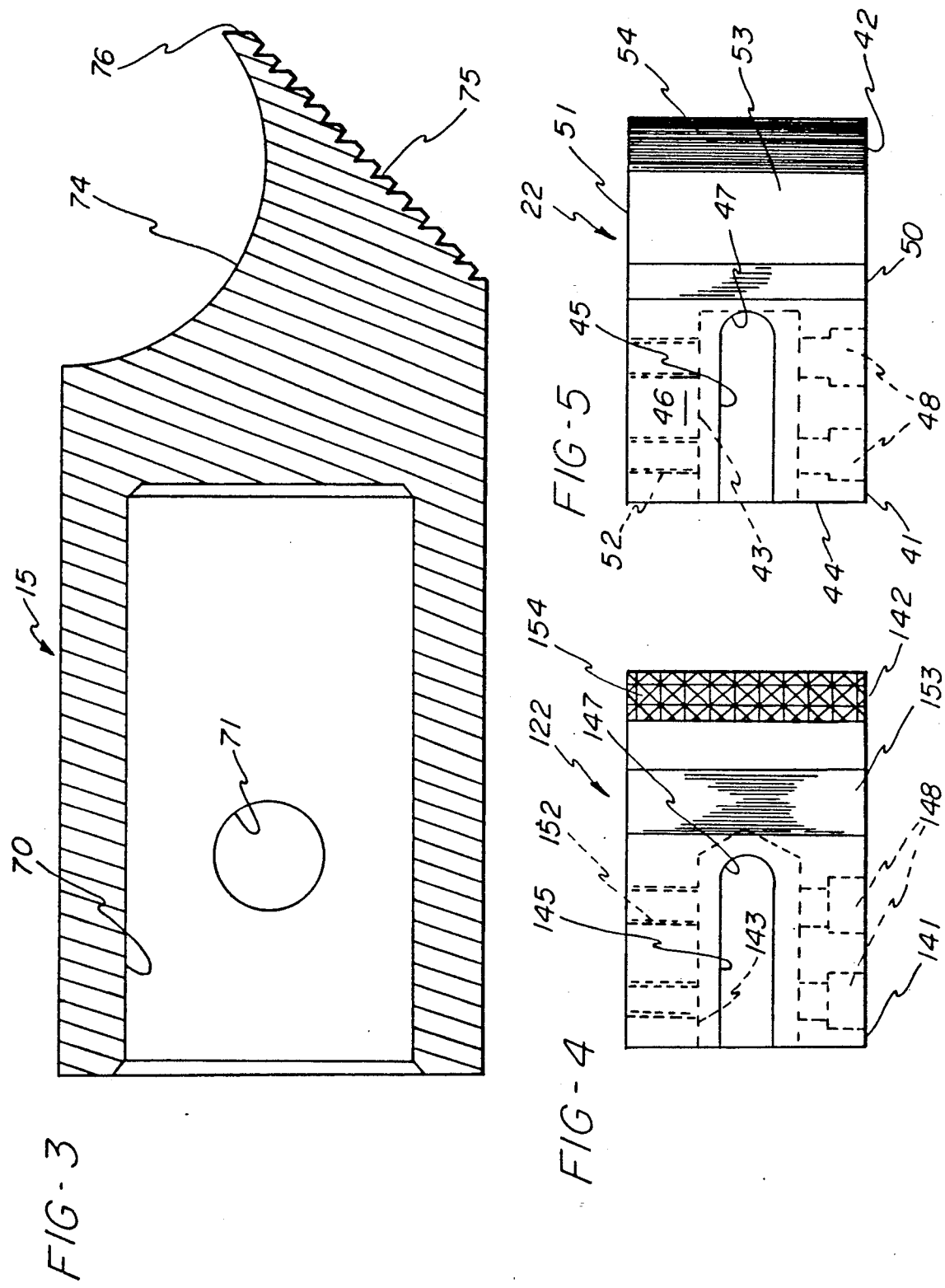

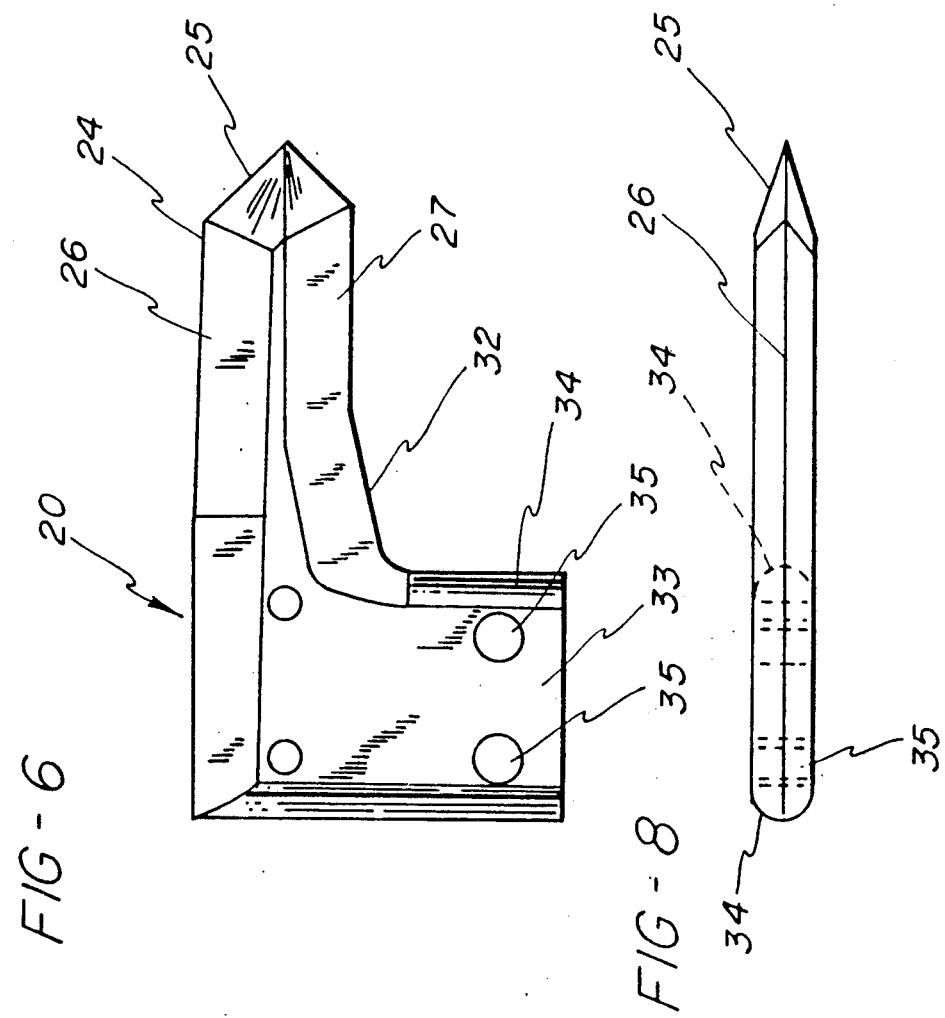

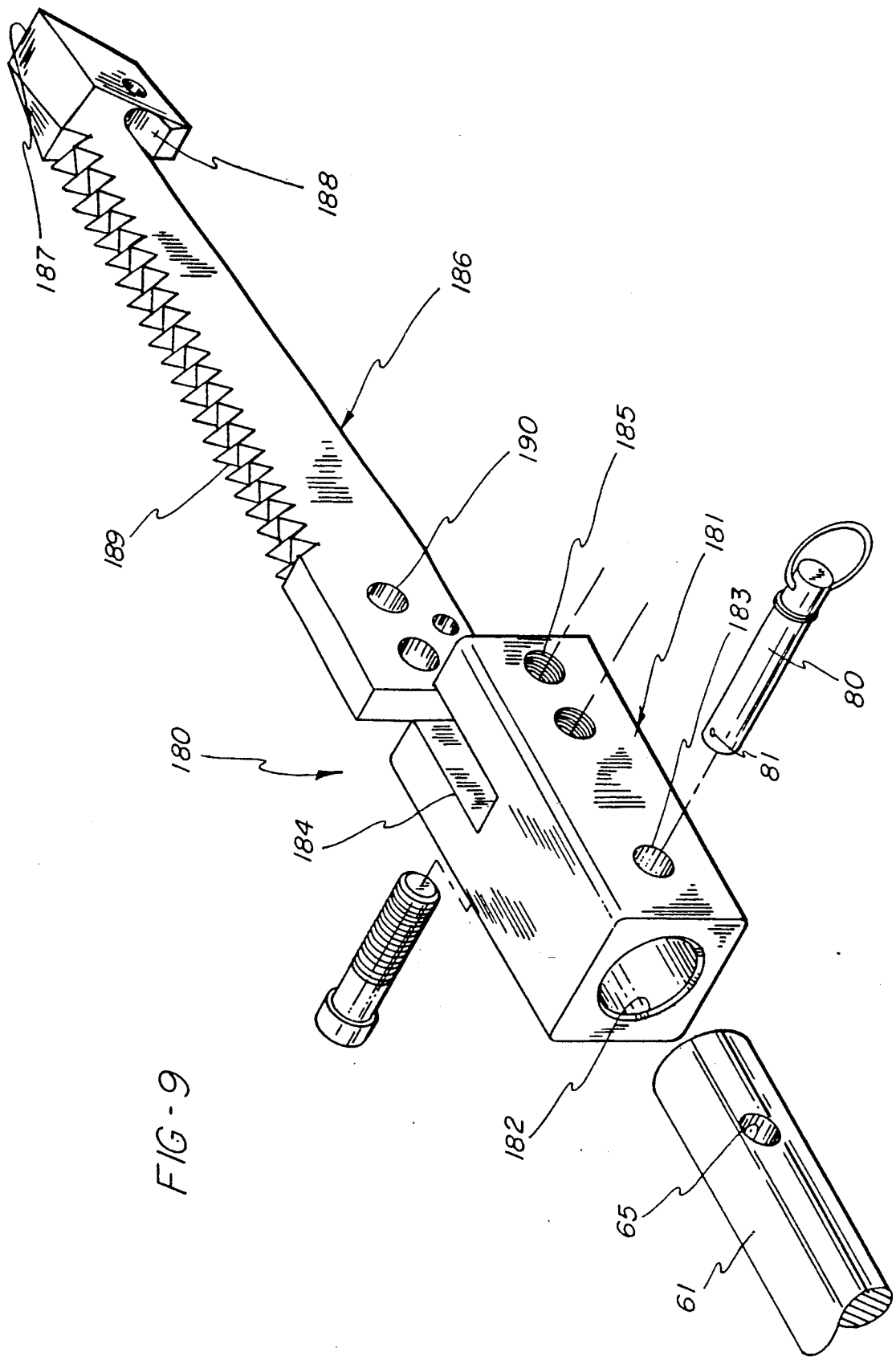

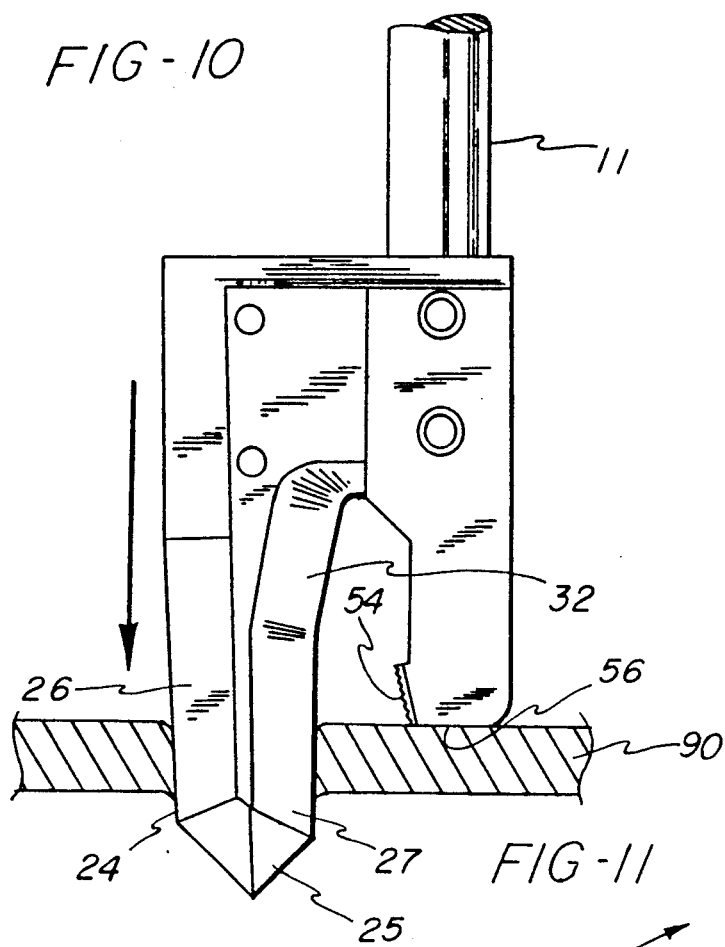
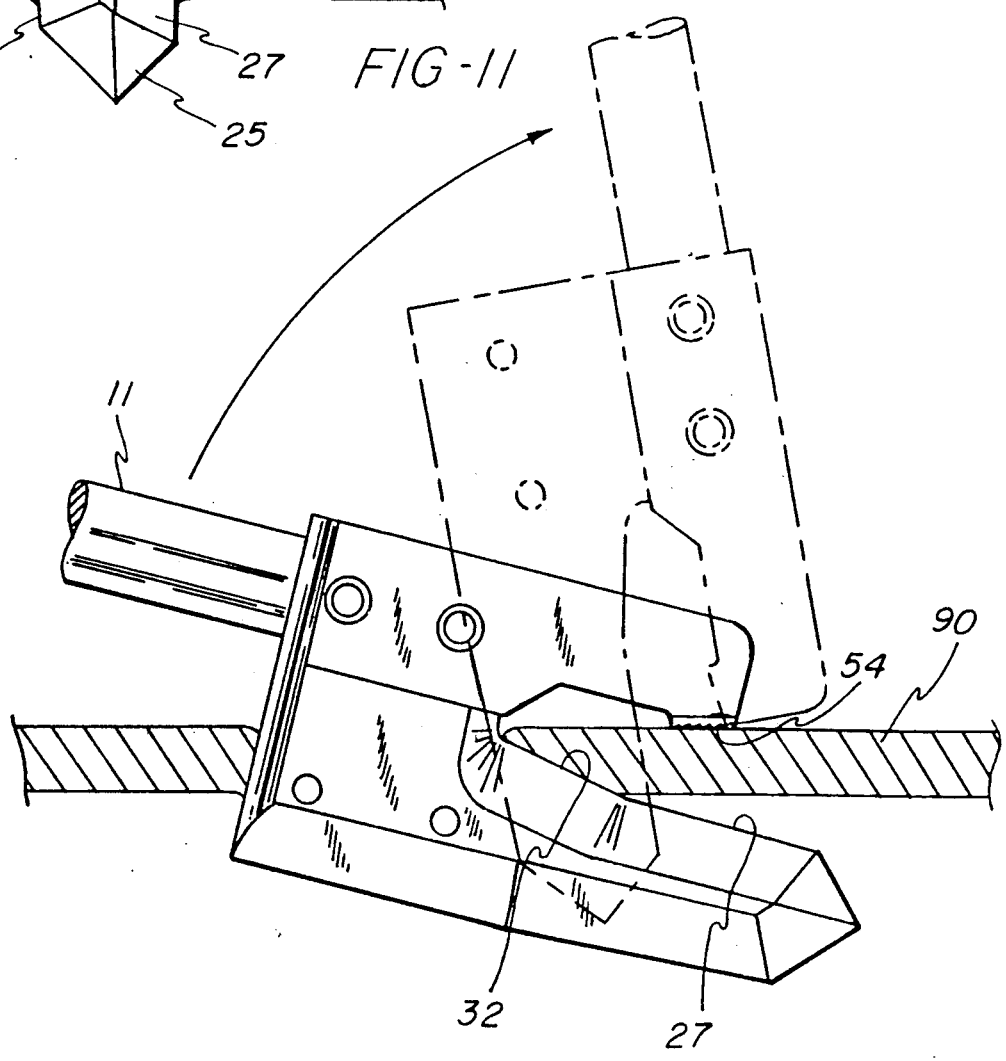

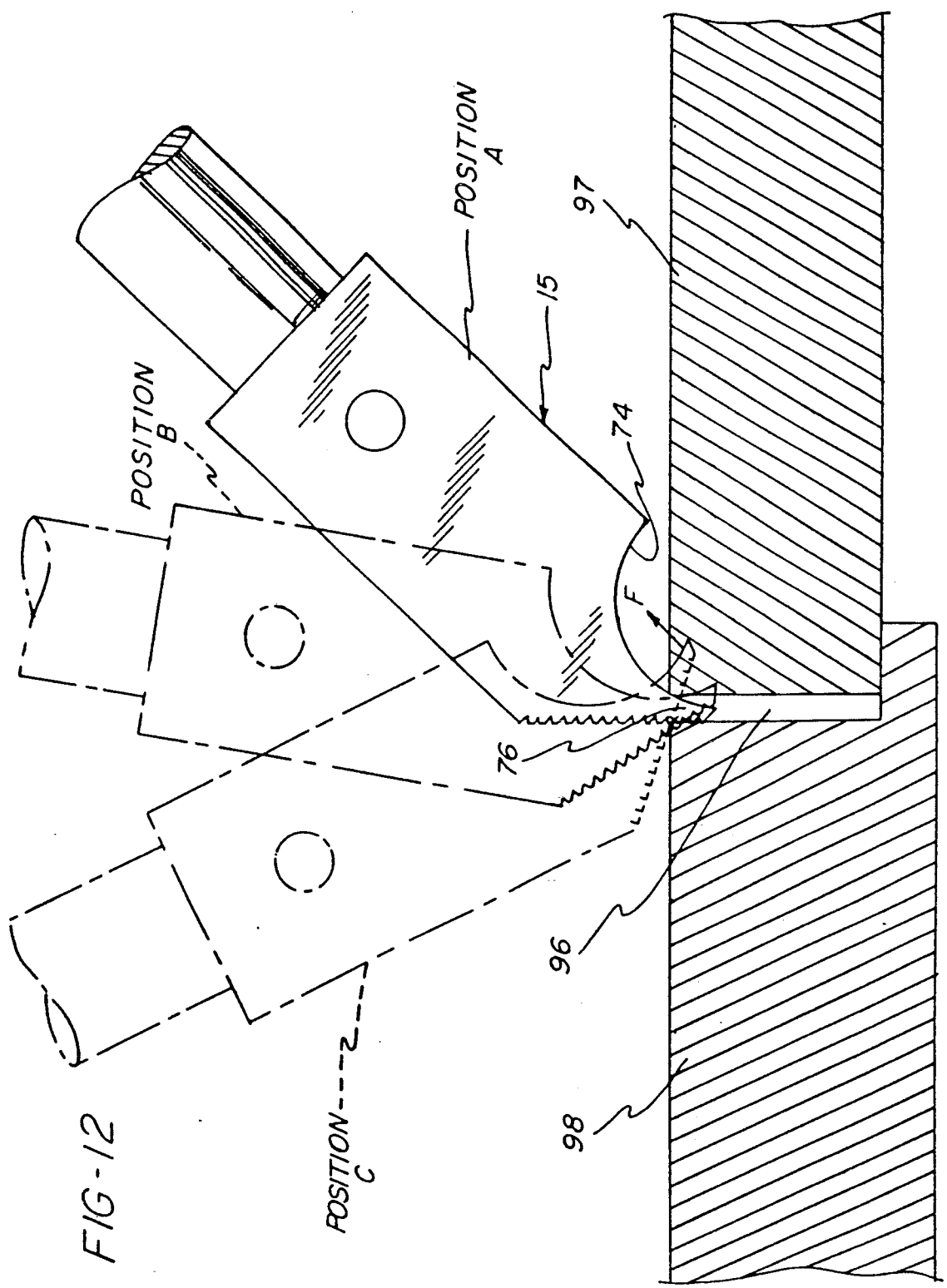

FORCIBLE ENTRY TOOL

BACKGROUND OF THE INVENTION

The subject invention relates to a forcible entry tool for the emergency entry of buildings and automobiles, and the like, for firefighters and various other emergency rescue personnel.

In various situations, emergency access into automobiles or buildings is required for the rescue of those trapped inside. For example, in serious automobile accidents, external entry through the doorways is often inhibited due to the damage to the door frames. In another example, an engine fire typically renders the hood release unusable because the hood latch partially within the engine compartment is inaccessible due to the heat and escaping flames. In such situations, the hood must be cut open to access the fire.

Various other situations are imaginable, including emergency entry into residential homes, steel sheds or warehouses. Once entered, it may also be necessary to force an entry into and through other areas within buildings, such as through sheet rock walls, and through ceilings and locked doors, to name just a few.

The prior art has proposed tools which are suitable for one or a limited number of such emergency situations, but even the best of such tools have disadvantages, including lack of versatility, redundancy of parts, and the like. The present invention has as its primary object the provision of an emergency entry tool which in its preferred form is capable of forming an entry through the majority of obstacles and which includes alternative accessories which enable it to handle virtually any emergency entry problem.

SUMMARY OF THE INVENTION

The objects of the invention were accomplished by designing a forcible entry tool comprising an elongate pry bar having pivot means extending from one end thereof. A cutting device comprising a mounting shank is attached to the pry bar, and a blade portion extends from the mounting shank longitudinally beyond the pivot means and essentially parallel to the pry bar. The blade portion has a sharpened inner edge facing the pivot means and a sharpened opposite outer edge.

In this manner, the blade portion is double sided and extends longitudinally beyond the fulcrum portion, and it can pierce through material to be cut by thrusting the tool vertically towards the material. Alternatively, the user can swing the outer edge of the blade into the material to be cut, thereby cutting an initial opening in the material.

Other aspects and advantages of the invention will be apparent from the following description, the accompanying drawings, and the appended claims.

BRIEF DESCRIPTION OF THE DRAWINGS

FIG. 1 is an isometric view of the forcible entry tool of the invention for use with wood and composite materials, which has a cutting portion at one end and a prying head at the opposite end;

FIG. 2 is a view similar to FIG. 1 showing an alternate embodiment of the forcible entry tool for use with steel;

FIG. 3 is a cross-sectional view of the prying head on line 3—3 of FIG. 1;

FIG. 4 is a plan view of the gripping block shown in FIG. 2;

FIG. 5 is a plan view of the gripping block shown in FIG. 1;

FIG. 6 is a side view of the knife member shown in either of FIGS. 1 or 2;

FIG. 7 is a front view of the knife member of FIG. 6;

FIG. 8 is a top view of the knife member of FIG. 6;

FIG. 9 shows an accessory cutting saw which can be attached to one end of the tool;

FIG. 10 shows the blade portion of the forcible entry tool piercing through material to be cut;

FIG. 11 shows the forcible entry tool in its first cutting position and, in phantom, rotated to the second cutting position; and FIG. 12 shows the pry bar moving from its first insertion position, through the positions shown in phantom, to move the door outwardly.

DESCRIPTION OF THE PREFERRED EMBODIMENT

With reference first to FIG. 1, the forcible entry tool 10 generally comprises an elongate pry bar 11, a cutting portion 12 and a prying head 15. The cutting portion 12 includes a knife member 20 and a gripping block 22.

With reference now to FIG. 6, the knife member 20 comprises a forward blade portion 24 having a sharpened tip 25, an outer sharpened edge 26, and an inner sharpened edge 27. The inner edge 27 extends rearwardly and intersects with an angled cutting edge 32. The knife member 20 further includes a mounting shank 33 having rounded forward and rearward edges 34, and mounting holes 35 extend through the shank 33. The edge 26 extends rearwardly from the forward blade portion 24 and intersects with the rearward edge 34, while the cutting edge 32 extends rearwardly and intersects with the forward rounded edge 34.

With reference now to FIGS. 1 and 5, the gripping block 22 comprises a rearward mounting portion 41 and a forward pivoting section 42. The rearward mounting portion 41 comprises a circular bore 43 extending longitudinally into the gripping block 22 through the rear face 44. The gripping block 22 further includes an open upper channel 45 through the upper surface 46 of the gripping block 22 which communicates with the cylindrical bore 43. The open upper channel 45 is also formed with a rounded end section 47, as shown in FIG. 5. Two counterbores 48 extend between the side walls 50 and 51, and through the center of the cylindrical bore 43, and are tapped at 52 to receive cap screws (not shown) therethrough.

With reference again to FIG. 1, the gripping block 22 includes a recess 53 between a forward gripping pad 54 and the mounting portion 41. As shown in FIG. 1, the gripping pad 54 is disposed at a slight angle, forming an outwardly converging surface, the purpose for which will be described in detail hereafter. As shown in FIGS. 1 and 5, the gripping pad 54 includes crosswise serrations 55 along the gripping pad 54 between the side walls 50 and 51 and adjacent to a front face 56 thereof. These serrations 55 have exhibited excellent gripping characteristics when used with wood or other composite materials such as drywall.

With reference still to FIG. 1, the tool 10 further includes an elongate pry bar 11 having a forward end 60 and a rearward end 61. A slot 62 extends through the forward end 60 of the bar 11 and has a rounded portion 63 at its inner end. Two holes 64 extend through both sections of the forward end 60 of the pry bar 11 in a transverse direction to the slot 62. The rearward end 61 of the pry bar 11 includes a pin-receiving through hole 65.

With reference now to FIGS. 1 and 3, the prying head 15 includes a cylindrical bore 70 and also includes a pin-receiving through hole 71 extending between side walls 72 and 73, and intersecting the cylindrical bore 70. As shown in FIG. 3, the prying head 15 includes at a forward end thereof, an arcuate surface 74, and a beveled surface 75. The arcuate surface 74 converges towards the surface 75 to form a tip section 76 at the front end of the prying head 15. The beveled surface 75 has a gripping sawtoothed cross-sectional configuration whereas the adjacent arcuate section 74 is generally smooth.

To assemble the tool as shown in FIG. 1, the forward end 60 of the elongate pry bar 11 is inserted into the cylindrical bore 43 of the gripping block 22 such that the slot 62 is angularly aligned with the open upper channel 45 in the gripping block 22. The mounting shank 33 of the knife member 20 is now inserted into the cooperating channel 45 and slot 62, with the forward rounded edge 34 adjacent the rounded edge 47 of the gripping block 22 and the rearward rounded edge 34 adjacent the rounded edge 63 of the elongate pry bar 11.

The mounting shank 33 is inserted such that the holes 35 align with the counterbores 48 in the gripping block 22, and with the holes 64 in the elongate pry bar 11. Cap screws (not shown) are then inserted into the counterbores 48 through the holes 64 and 35 and into threadable engagement with the tapped holes 52. Tightening of the cap screws retains the gripping block 22, knife member 20, and elongate pry bar 11 in secured relation, one to the other.

At the opposite end 61 of the elongate pry bar 11, the prying head 15 is inserted over end 61 of the elongate pry bar 11, such that the through hole 71 is angularly aligned with the through hole 65 in the elongate pry bar 11. The pin 80 is inserted into the through holes 71 and 65 thereby retaining the prying head 15 to the elongate pry bar 11. The pin 80 is of the type having a spring-loaded detent ball 81, thereby allowing quick insertion and release of the pin 80.

As assembled and depicted in FIG. 1, the forcible entry tool 10 is suitable for cutting through wall board, such as dry wall, masonite, panelling, or doors. This material will be referred to generally as sheet material and is shown generally at 90 in FIGS. 10 and 11. The blade portion 24 is forced through the material 90 as shown in FIG. 10, until the front face 56 of the gripping block 22 abuts the material 90. As the blade portion 24 extends beyond the front face 56 of the gripping block 22, the blade portion 24 can pierce through the sheet material 90. The sharpened edges 25, 26 and 27 assist in this piercing effect through the sheet material 90. As the gripping block 22 has a wide lateral extent, the front face 56 abuts the material to be pierced, preventing the entire tool from entering the hole and, advantageously, from being caught in the formed hole.

Once an opening is pierced through the sheet material 90, the elongate pry bar 11 can be rotated in a counterclockwise sense (as viewed in FIGS. 10 and 11) to the position shown in FIG. 11 where the gripping pad 54 lies adjacent and parallel with an upper surface of the sheet material 90. As shown in FIG. 11, the tool is now rotated in the clockwise sense, to the position shown in phantom in FIG. 11, and the cutting edge 32 shears through the sheet material 90. The individual serrations 55 of the gripping pad 54 grip into the drywall or wood to prevent slippage of the cutting edge 32 with respect to the material 90. The material 90 is severed by continued pumping of the cutting tool, between the two positions shown in FIG. 11.

As shown in FIG. 11, due to the configuration of the gripping pad 54 as an outwardly converging surface, when the gripping pad 54 is placed against the material 90, the pry bar 11 is in at a convenient angle for use. Cutting edge 32 is also slightly angled relative to the cutting edge 27, such that when the tool is in the initial position as shown in FIG. 11, there is an increased component of cutting force in the direction of the material to be cut.

Alternatively, rather than piercing through the sheet material 90 with the tip 25, the outer sharpened edge 26 can be used as an axe blade, to sever the sheet material 90. Once again, the cutting blade 20 cannot penetrate through the created opening and get caught like a conventional axe, because the gripping block 22 will again prevent the entire blade from entering the created opening.

In the event a looked door must be opened quickly, the opposite end of the tool 10 is readily available for use by inserting the tip 76 of the prying head 15 into the slot 96 formed between the door 97 and its respective door frame 98, as shown in FIG. 12. The prying head 15 is movable by rotation of the pry bar 11 from a position shown as position A to a position shown as position C. Due to the arcuate surface 74, when the pry head 15 is in the position shown as position C, the resultant force will be normal to the tip 76, and will be largely in a direction to open the door 97.

In previous pry bar configurations, without the arcuate surface 74, the prying portion tended only to spread the door and the door jamb apart thereby making the slot larger, but did not spring the door open. Advantageously, the surface 75 has a sawtooth configuration to grip the edge of the door frame 98, preventing the prying head 15 from slipping.

With reference now to FIGS. 2 and 4, an alternative gripping block 122 is shown for cutting through sheet steel. The gripping block 122 is similar to the gripping block 22 and also includes a bore 143 for receipt over the elongate pry rod 11. The gripping block 122 further includes an open upper channel 145 for receiving the cutting knife 20, and cap screw holes 148 for securing the gripping block 122 and the knife member 20 to the elongate pry bar 11.

The gripping block 122 is however, configured somewhat differently for use with sheet steel. The gripping block 122 includes a forward pivoting portion 142, comprised of a forward gripping pad 154. As shown in FIG. 2, the gripping pad 154 is not outwardly converging, but rather is generally parallel to the pry bar 11. Unlike the serrations 55 on the gripping pad 54, the gripping pad 154 has sharpened teeth 155, which have exhibited better gripping characteristics when the tool is used for cutting through sheet steel. Although not specifically shown, the combination of the knife member 20 and the gripping block 122 is used in an identical manner as that shown and described in FIGS. 10 and 11, to cut through sheet steel.

As also shown in FIG. 2, an alternate prying head 115 has a bore 170 at one end and a tip 175 at the opposite end, formed by planar surfaces 176 and 177. Pin 80 retains the prying portion 115 to the end 61 of the elongate rod 11. This design is similar in nature to a conventional pry bar configuration, but due to the mounting design, the prying head 115 can be easily and conveniently installed, removed and stored for later use.

With reference now to FIG. 9, a saw assembly 180 is shown which can be pinned to the end 61 of the elongate bar 11. An adaptor block 181 has a longitudinal bore 182 receiving the bar end 61, and a cross-bore 183 receiving the pin 80 through the bore 183 and through the bore 65 in the elongate pry bar 11. The block 181 further comprises a slot 184 having transverse threaded holes 185 therethrough. The assembly 180 further includes a saw blade 186 having a piercing tip 187, a hook 188, serrated teeth 189, and mounting holes 190. With the saw assembly attached to the pry bar end 61, the saw assembly can be used for cutting through such sheet material as dry wall, masonite, and other wood composite board, while the hook 188 can be used to remove the cut pieces out of the way.

Advantageously, the forcible entry tool, as shown in FIGS. 1–12, can easily pierce through sheet materials by either swinging the blade into the material, or by thrusting the tip of the blade into the material. Once the opening is created, the tool also has improved cutting capabilities over previous designs in that the pivot point for the tool is defined as a gripping pad having specially designed contours for the material to be cut.

Moreover, due to the design of the forcible entry tool, the components of the tool can be conveniently stored for use. When disassembled, the components can be conveniently stored in a tool chest in the rescue vehicle without concern for misplacing the components. Furthermore, as the tool is modular in nature, the tool can be reassembled into several various devices without repetition of components. More specifically, the gripping blocks 22 and 122 are interchangeable, and in combination with the cutting knife 20, are secured to end 60 of the pry bar 11 for the specific material to be cut. Furthermore, three other tools, the prying heads 15 and 115 and the saw assembly 180 are quickly interchangeable at end 61 of the pry bar 11 to add additional features and capabilities to the forcible entry tool.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An emergency forcible entry tool for cutting through sheet material, comprising:
   an elongate pry bar having first and second ends;
   pivot means extending from said first end of said bar;
   a knife member comprising a mounting shank attached to said first end of said bar and a blade portion extending from said mounting shank longitudinally beyond said pivot means and essentially parallel to said bar, said blade portion having a sharpened inner edge facing said pivot means and a sharpened outer opposite edge, said inner and outer edges leading into a sharpened end tip, said sharpened inner edge comprising a first cutting edge extending rearwardly from said tip towards said mounting shank, and a second cutting edge extending from said first cutting edge and angled towards said mounting shank and said pivot means.

2. The tool as claimed in claim 1, wherein said pivot means includes a gripping pad profiled for gripping the surface of the sheet material to be cut, said gripping pad extending in a plane transverse to a plane of said knife member and extending laterally substantially beyond a width of said knife member.

3. The tool as claimed in claim 2 wherein said gripping pad includes individual gripping teeth.

4. The tool as claimed in claim 2, wherein said gripping pad is defined as an outwardly converging surface having lateral extent.

5. The tool as claimed in claim 4, wherein said gripping pad is serrated along said lateral extent thereof.

6. The tool as claimed in claim 1, wherein said knife member and said pivot means are discrete from each other and are removable from said pry bar.

7. An emergency forcible entry tool, comprising:
   a pry bar having first and second ends;
   a first entry tool comprising a knife member having a mounting shank and a blade portion extending from said mounting shank;
   a gripping block removably attached to said first end of said bar, said gripping block having pivot means extending from a forward end thereof and, at the rear end thereof, means for attaching said gripping block to said first end of said bar, said gripping block further comprising means for receiving said mounting shank of said knife member, said gripping block extending in a plane transverse to a plane of said knife member and extending laterally substantially beyond a width of said knife member;
   fastening means for removably attaching said knife member and said gripping block to said first end of said pry bar; and
   a second entry tool removably attached to said second end of said bar.

8. The cutting tool of claim 7 wherein said second entry tool comprises a prying head.

9. The cutting tool of claim 8 wherein said prying head includes a generally planar surface and an arcuate surface adjacent said planar surface, said arcuate surface converging towards said planar surface to form a prying tip.

10. The tool of claim 7, wherein said second entry tool comprises a saw blade assembly.

11. The tool as claimed in claim 7, wherein said gripping block includes a longitudinal bore extending inwardly from one end thereof, and sized to receive said first end of said bar.

12. The tool as claimed in claim 11, wherein said gripping block includes an open upper channel at said rear end thereof, intersecting with said longitudinal bore.

13. The tool as claimed in claim 12, wherein said first end of said bar includes a slot coinciding with said open channel in said gripping block and thereby forming a through slot perpendicular to the length of said pry bar.

14. The tool as claimed in claim 13, wherein said mounting shank of said knife member is profiled for receipt in said through slot.

15. The tool as claimed in claim 14, wherein said fastening means extend perpendicularly into said through slot, thereby securing said knife member and gripping block to said bar.

16. An emergency forcible entry tool, comprising:
    an elongate pry bar having first and second ends;
    pivot means extending from said first end of said bar;
    a cutting device comprising a mounting shank attached to said bar and a blade portion extending from said mounting shank longitudinally beyond said pivot means and essentially parallel to said bar, said blade portion including a sharpened inner edge facing said pivot means, thereby defining a first blade edge; and a prying portion removably attached to said second end of said bar, said prying portion comprising a block having first and second ends, the first end having an opening for slidable receipt over said second end of said pry bar, said prying portion further comprising top and bottom surfaces and side surfaces, a prying end being defined by a first substantially planar beveled surface extending from said bottom surface towards the center of said prying portion, and a second arcuate surface extending from said top surface converging towards said beveled surface to form a prying tip at the free end of said prying portion, said beveled surface having a roughened gripping surface.

17. A cutting tool as claimed in claim 16, wherein said beveled surface is crosswise serrated.

18. The cutting tool of claim 16, wherein said sharpened inner edge includes a first section adjacent said shank portion which is angled relative to said bar, and a second section which extends from said first section to the tip of said blade portion.

19. The cutting tool of claim 18, wherein said blade portion includes an outer edge opposite said sharpened inner edge, which is sharpened to form a second blade edge.

* * * * *